(12) United States Patent
Kisumi

(10) Patent No.: US 11,488,780 B2
(45) Date of Patent: Nov. 1, 2022

(54) CERAMIC ELECTRONIC COMPONENT

(71) Applicant: Murata Manufacturing Co., Ltd., Nagaokakyo (JP)

(72) Inventor: Tetsuya Kisumi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/463,759

(22) Filed: Sep. 1, 2021

(65) Prior Publication Data

US 2022/0093336 A1    Mar. 24, 2022

(30) Foreign Application Priority Data

Sep. 19, 2020    (JP) .............................. JP2020-157976

(51) Int. Cl.
*H01G 4/232* (2006.01)
*H01G 4/30* (2006.01)
*H01G 4/12* (2006.01)

(52) U.S. Cl.
CPC ............. *H01G 4/2325* (2013.01); *H01G 4/30* (2013.01); *H01G 4/1227* (2013.01)

(58) Field of Classification Search
None
See application file for complete search history.

(56) References Cited

U.S. PATENT DOCUMENTS

| | | | |
|---|---|---|---|
| 11,264,177 B2* | 3/2022 | Saruban | H01G 4/30 |
| 2018/0082787 A1* | 3/2018 | Hamamori | H01G 4/2325 |
| 2018/0108483 A1* | 4/2018 | Sasabayashi | H01G 4/248 |
| 2018/0166215 A1* | 6/2018 | Hamanaka | H01G 4/12 |
| 2020/0411247 A1* | 12/2020 | Saruban | H01G 4/2325 |
| 2022/0093333 A1* | 3/2022 | Kisumi | H01G 4/2325 |
| 2022/0093336 A1* | 3/2022 | Kisumi | H01G 4/30 |
| 2022/0262566 A1* | 8/2022 | Fukuda | H01G 4/248 |

FOREIGN PATENT DOCUMENTS

JP          05-003132 A       1/1993

* cited by examiner

*Primary Examiner* — Dion R. Ferguson
(74) *Attorney, Agent, or Firm* — Keating & Bennett, LLP

(57) ABSTRACT

A ceramic electronic component includes an outer electrode including a baked electrode layer including an electrically conductive metal and glass, and a plating film on a surface of the baked electrode layer. The baked electrode layer includes metal portions made of the electrically conductive metal and glass portions made of the glass and distributed so as to be in contact with the metal portions. Cracks starting from boundaries between the metal portions and the glass portions and extending toward the inner side of the glass portions are provided in the glass portions.

12 Claims, 2 Drawing Sheets

CERAMIC ELECTRONIC COMPONENT

CROSS REFERENCE TO RELATED APPLICATIONS

This application claims the benefit of priority to Japanese Patent Application No. 2020-157976 filed on Sep. 19, 2020. The entire contents of this application are hereby incorporated herein by reference.

BACKGROUND OF THE INVENTION

1. Field of the Invention

The present invention relates to a ceramic electronic component and, more particularly, to the structure of an outer electrode provided on a surface of a ceramic body included in a ceramic electronic component.

2. Description of the Related Art

A chip ceramic electronic component, such as a multilayer ceramic capacitor, includes a ceramic body including inner electrodes partially exposed at the surface of the ceramic body, and outer electrodes disposed on a portion of the surface of ceramic body and electrically connected to the inner electrodes. Each outer electrode includes a baked electrode layer containing an electrically conductive metal such as copper and glass, and a plating film disposed on the surface of the baked electrode layer. The plating film is formed by electroplating and includes, for example, a nickel layer and a tin layer on the nickel layer.

The ceramic electronic component described above is mounted on a substrate with the outer electrodes interposed therebetween. Therefore, stress caused by distortion or vibration of the substrate or the difference in thermal expansion between the substrate and the ceramic body is transmitted through the outer electrodes to the ceramic body, and this may cause cracking in the ceramic body.

To address the above problem, for example, Japanese Unexamined Patent Application Publication No. 5-3132 discloses a multilayer ceramic capacitor in which a plurality of voids are present in a baked electrode layer in each outer electrode. In Japanese Unexamined Patent Application Publication No. 5-3132, the size of the voids in the thickness direction of the baked electrode layer is, for example, about 10 µm to about 50 µm, and the size of the voids in the width direction of the baked electrode layer is, for example, about 30 µm to about 100 µm. The inner walls of the voids are covered with glass, and the thickness of the glass is about 0.1 µm to about 5 µm, for example.

The presence of the voids reduces the Young's modulus of the baked electrode layer. Therefore, when external mechanical or thermal stress is applied to the multilayer ceramic capacitor after mounting, the baked electrode layer deforms flexibly, and therefore the external stress can be relaxed. It is therefore described in Japanese Unexamined Patent Application Publication No. 5-3132 that a highly reliable high performance multilayer ceramic capacitor that can resist external stress can be provide.

The miniaturization of ceramic electronic components requires a reduction in the thickness of the outer electrodes, particularly the baked electrode layers. However, when the thickness of baked electrode layers containing voids introduced using the technique described in Japanese Unexamined Patent Application Publication No. 5-3132 is reduced, the presence of the voids reduces the denseness of the baked electrode layers.

SUMMARY OF THE INVENTION

Preferred embodiments of the present invention provide ceramic electronic components each including outer electrodes in which, after mounting of the ceramic electronic component, external mechanical or thermal stresses can be reduced or prevented without relying on the presence of voids.

A ceramic electronic component according to a preferred embodiments of the present invention includes a ceramic body including an inner electrode including a portion exposed at a surface of the ceramic body, and an outer electrode disposed on a portion of the surface of the ceramic body and electrically connected to the inner electrode.

The outer electrode includes a baked electrode layer including an electrically conductive metal and glass and a plating film disposed on a surface of the baked electrode layer, and the baked electrode layer includes a metal portion including the electrically conductive metal and a glass portion including the glass and distributed so as to be in contact with the metal portion.

In a preferred embodiment of the present invention, a crack starting from a boundary between the metal portion and the glass portion and extending toward an inner side of the glass portion is present in the glass portion.

The crack starting from the boundary between the metal portion and the glass portion and extending toward the inner side of the glass portion is provided in the glass portion in the baked electrode layer. The crack functions such that, after mounting of the ceramic electronic component, external mechanical or thermal stress is relaxed without substantially reducing the denseness of the baked electrode layer, so that the ceramic electronic component can resist the external stress.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

To explain ceramic electronic components according to preferred embodiments of the present invention, a multilayer ceramic capacitor is used as an example of the ceramic electronic component.

Figure 1:
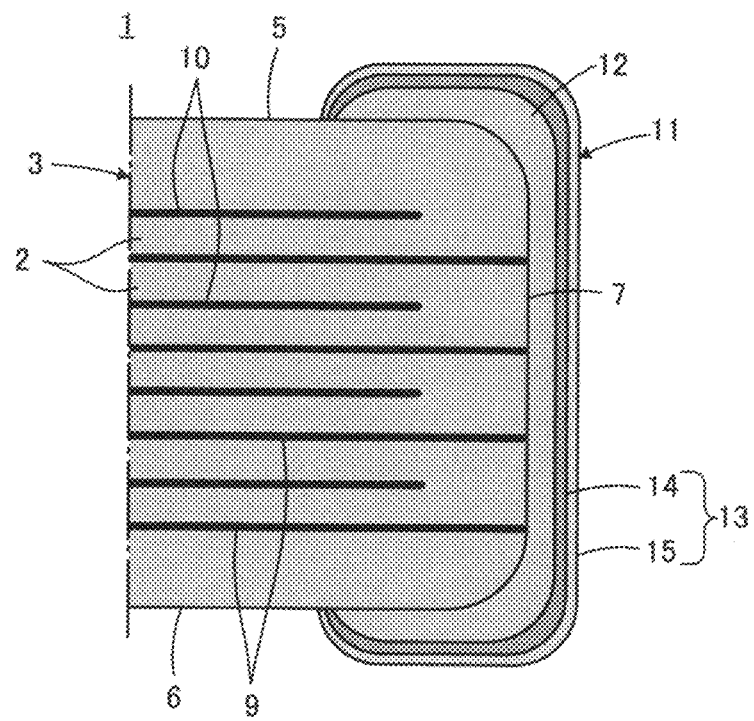
FIG. 1 is a cross-sectional view schematically showing a portion of a multilayer ceramic capacitor as an example of a ceramic electronic component according to a preferred embodiment of the present invention.

Referring to FIG. 1, the multilayer ceramic capacitor 1 includes a ceramic body 3 including a plurality of laminated ceramic layers 2 made of a dielectric ceramic. The ceramic body 3 includes a first principal surface 5 and a second principal surface 6 that are opposed to each other, a first end surface 7 connecting these principal surfaces, an unillustrated second end surface opposed to the first end surface 7, and unillustrated first and second side surfaces extending parallel or substantially parallel to the drawing sheet in FIG. 1 and opposed to each other.

The ceramic body 3 further includes a plurality of first inner electrodes 9 and a plurality of second inner electrodes 10 that are disposed along a plurality of boundaries between the ceramic layers 2. The ceramic body 3 has a laminated structure in which the ceramic layers 2 and the first and second inner electrodes 9 and 10 are disposed alternately in the laminating direction such that the ceramic layers 2 are interposed between the respective first and second inner electrodes 9 and 10.

The first inner electrodes 9 extend to the first end surface 7 shown in FIG. 1, and edges of the first inner electrodes 9 are exposed at the first end surface 7 of the ceramic body 3. The second inner electrodes 10 extend to the unillustrated second end surface, and edges of the second inner electrodes 10 are exposed at the second end surface of the ceramic body 3. The inner electrodes 9 and 10 include, for example, nickel as an electrically conductive component.

An illustrated outer electrode, i.e., a first outer electrode 11, covers the first end surface 7, which is a portion of the surface of the ceramic body 3, and is electrically connected to the first inner electrodes 9. Although not illustrated, a second outer electrode opposed to the first outer electrode 11 covers the second end surface, which is a portion of the surface of the ceramic body 3, and is electrically connected to the second inner electrodes 10. The first outer electrode 11 and the second outer electrode have the same or substantially the same structure. Therefore, the structure of the first outer electrode 11 will be described in detail, and the description of the structure of the second outer electrode will be omitted.

The first outer electrode 11 extends from the first end surface 7 to portions of the first and second principal surfaces 5 and 6 and the first and second side surfaces that are adjacent to the first end surface 7. The first outer electrode 11 includes a baked electrode layer 12 including an electrically conductive metal such as copper and glass, for example, and a plating film 13 disposed on the surface of the baked electrode layer 12. The plating film 13 includes, for example, a nickel layer 14 and a tin layer 15 on the nickel layer 14.

To provide the first outer electrode 11, the following steps are performed. First, the step of forming the baked electrode layer 12 is performed. This step includes applying an electrically conductive paste including the electrically conductive metal and the glass such that the electrically conductive paste covers the exposed portions of the first inner electrodes 9 on the ceramic body 3 and then baking the applied electrically conductive paste. Then the step of forming the plating film 13 on the surface of the baked electrode layer 12 by electroplating is performed. Moreover, after the formation of the baked electrode layer 12 but before the formation of the plating film 13, the step of subjecting the surface of the baked electrode layer 12 to barrel processing or blast processing is performed.

In the barrel or blast processing, a powder having a Mohs hardness equal to or lower than the Mohs hardness of a portion of the ceramic body 3 that is exposed from the baked electrode layer 12 is preferably used. As described above, the powder selected has a Mohs hardness equal to or lower than the Mohs hardness of the portion of the ceramic body 3 that is exposed from the baked electrode layer 12, i.e., the Mohs hardness of the ceramic layers 2. In this case, chipping and cracking of the ceramic body 3 are unlikely to occur.

When the ceramic layers 2 are made of, for example, barium titanate, its Mohs hardness is about 8 to about 8.5. Therefore, the Mohs hardness of the powder is preferably about 8.5 or less and more preferably about 7.5 or less, for example.

Figure 2:
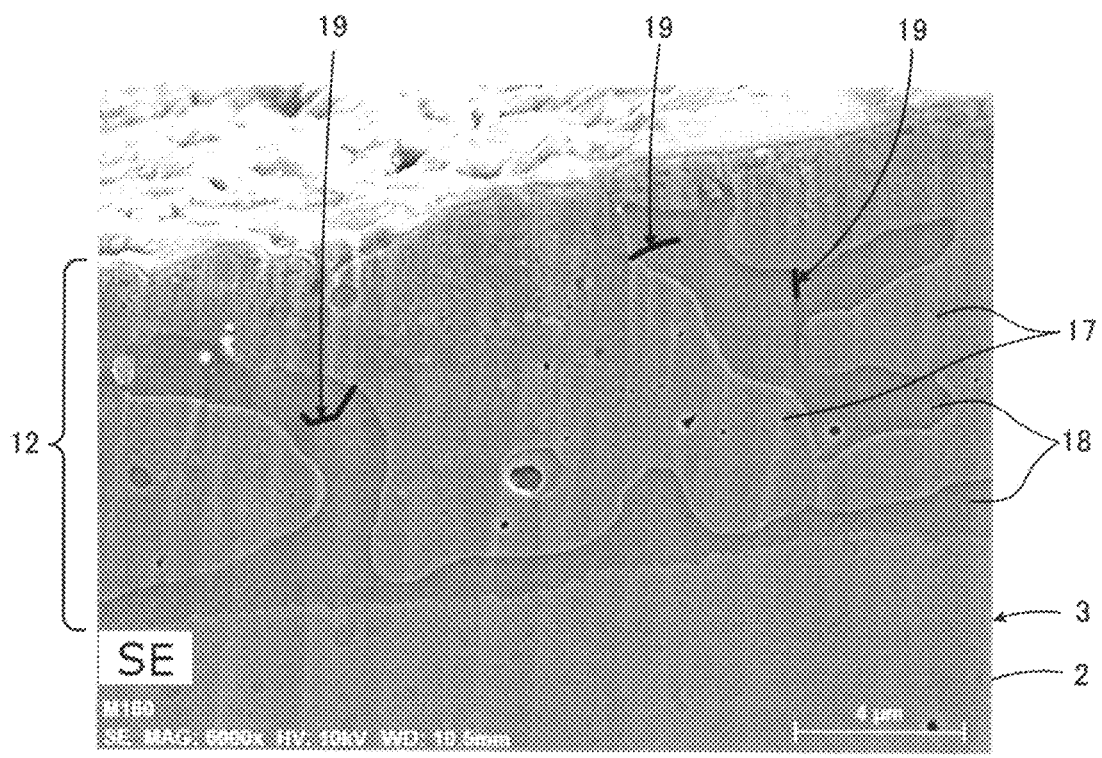
FIG. 2 is a photograph of a cross section of a baked electrode layer in an Experimental Example for producing the multilayer ceramic capacitor shown in FIG. 1, the photograph being taken by an SEM/EDX after blast processing of the baked electrode layer but before the formation of a plating film.

As described above, the baked electrode layer 12 is formed by applying the electrically conductive paste including the electrically conductive metal and the glass and baking the applied paste. Therefore, as shown in FIG. 2, the baked electrode layer 12 includes metal portions 17 including the electrically conductive metal and glass portions 18 including the glass and distributed so as to be in contact with the metal portions 17. In FIG. 2, regions with lower brightness are the glass portions 18. The amount of the glass in the baked electrode layer 12 is preferably about 17% by volume or more, for example.

As a result of the barrel or blast processing, cracks 19 starting from the boundaries between the metal portions 17 and the glass portions 18 and extending toward the inner side of the glass portions 18 are produced in the glass portions 18 in the baked electrode layer 12 as shown in FIG. 2. In FIG. 2, to show the cracks 19 more clearly, the cracks 19 are traced with thick lines. The cracks 19 act such that, after mounting of the multilayer ceramic capacitor 1, external mechanical or thermal stress is relaxed, and therefore the multilayer ceramic capacitor 1 can resist external stress. The cracks 19 do not substantially reduce the denseness of the baked electrode layer 12.

As described above, after the barrel or blast processing, the step of forming the plating film 13 on the surface of the baked electrode layer 12 by electroplating is performed. More specifically, first, nickel plating is performed to form the nickel layer 14, and then tin plating is performed to form the tin layer 15.

When the electroplating is performed, it is preferable that the metal is present on the surface of the baked electrode layer 12 as continuously as possible. In other words, it is preferable that the area of metal-lacking portions in which the metal portions 17 are not present on the surface of the baked electrode layer 12 is reduced as much as possible.

Figure 3:
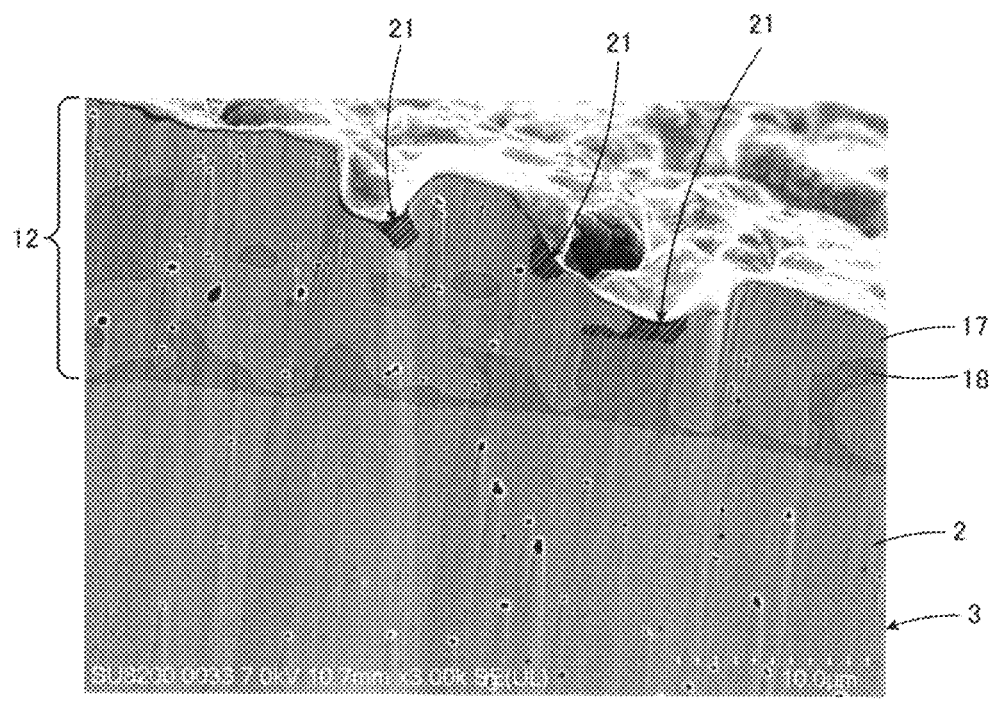
FIG. 3 is a photograph of a baked electrode layer with glass portions floating on its surface in the Experimental Example shown in FIG. 2, the photograph being taken by the SEM/EDX after the formation of the baked electrode layer.

The metal-lacking portions on the surface of the baked electrode layer 12 may be typically formed when, for example, the glass included in the baked electrode layer 12 floats to the surface of the baked electrode layer 12. FIG. 3 shows some metal-lacking portions 21 formed of the glass that has floated to the surface of the baked electrode layer 12. In FIG. 3, to show the metal-lacking portions 21 formed of the glass more clearly, the metal-lacking portions 21 are hatched.

Figure 4:
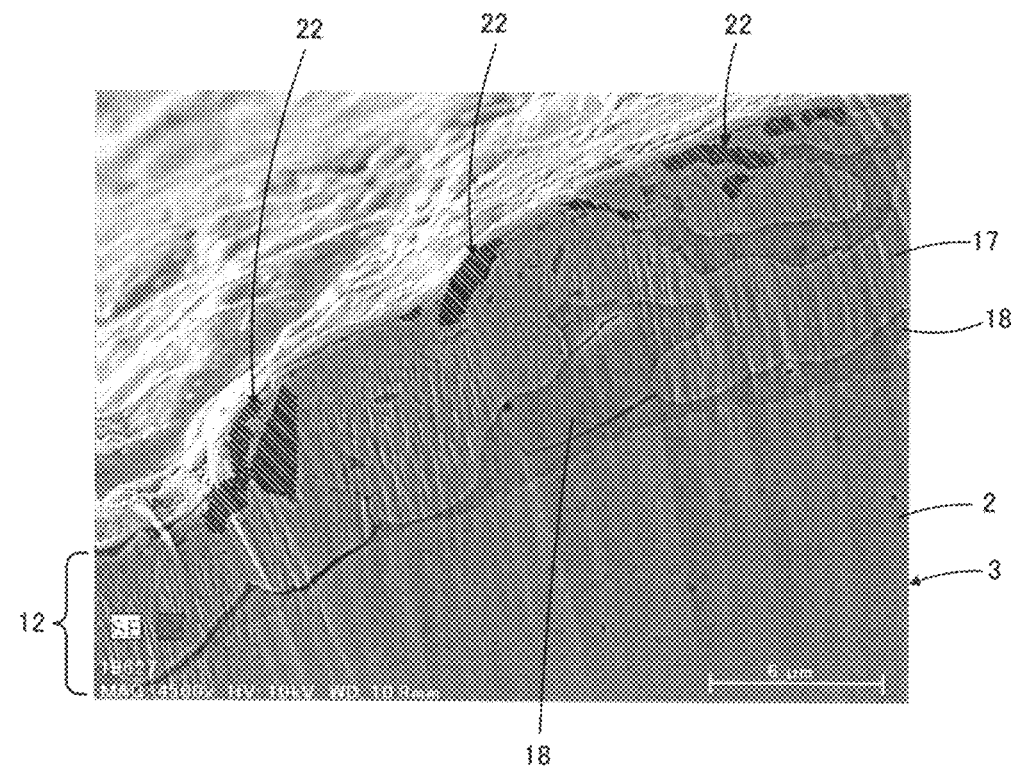
FIG. 4 is a photograph of a cross section of a baked electrode layer with metal-lacking portions generated due to adhesion of a blasting material in the Experimental Example shown in FIG. 2, the photograph being taken by the SEM/EDX after blast processing of the baked electrode layer.

The metal-lacking portions on the surface of the baked electrode layer 12 may also be formed when the powder used for the barrel or blast processing adheres to the baked electrode layer 12. FIG. 4 shows metal-lacking portions 22 formed by adhesion of the powder. In FIG. 4, to show the metal-lacking portions 22 due to the adhesion of the powder more clearly, the metal-lacking portions 22 are hatched.

The metal-lacking portions 21 formed of the glass provide non-electrically conductive regions on the surface of the baked electrode layer 12 because the glass is not electrically conductive. The metal-lacking portions 22 formed by the adhesion of the powder also provide non-electrically conductive regions on the surface of the baked electrode layer 12 because the powder is made of a material, such as zircon or zirconia, for example, and is therefore not electrically conductive.

These metal-lacking portions 21 or 22 reduce or prevent precipitation of the plating film 13 on the surface of the baked electrode layer 12 by electroplating. Therefore, after the formation of the plating film 13, solder popping (a phenomenon in which a plating solution that has intruded into the baked electrode layer 12 or the plating film 13 is vaporized by heat during soldering and bursts to cause a solder ball to splatter) may occur. To prevent the solder popping, it is preferable to prevent the formation of the metal-lacking portions 21 or 22 as much as possible.

It has been discovered that the occurrence and disappearance of the metal-lacking portions 21 or 22 and an increase and a decrease in the number of metal-lacking portions 21 or 22 are related to the shape of the particles in the powder used for the barrel or blast processing.

When the particles in the powder have an irregular shape, for example, an angular shape, the powder can crush the glass in the metal-lacking portions 21 formed of the glass to thus remove the metal-lacking portions 21. Specifically, the metal-lacking portions 21 formed of the glass can disappear or be reduced in number. However, as for the powder formed of particles having an angular shape, the powder itself is chipped and finely pulverized. The pulverized powder is likely to adhere to the surface of the baked electrode layer 12, and the adhesion of the powder causes the occurrence of the metal-lacking portions 22 or an increase in the number of metal-lacking portions 22. In particular, when the blast processing is performed, the powder (blasting material) formed of particles having an angular shape is likely to stick to the surface of the baked electrode layer 12, and this also causes the occurrence of the metal-lacking portions 22 due to the adhesion of the powder or an increase in the number of metal-lacking portions 22.

When the powder used for the barrel or blast processing is formed of particles having a spherical shape, the powder acts to squeeze the metal portions 17 present on the surface of the baked electrode layer 12. In this case, the area of the metal portions 17 on the surface of the baked electrode layer 12 increases, and the powder crushes the glass portions 18 to thus remove them. This results in an increase in the ratio of the metal occupying the outermost surface of the baked electrode layer 12. When the powder is formed of particles having a spherical shape, the powder is unlikely to adhere to the surface of the baked electrode layer 12. Therefore, the metal-lacking portions 21 formed of the glass and the metal-lacking portions 22 formed of the powder on the surface of the baked electrode layer 12 are reduced in number or disappear.

When the powder is formed of particles having a spherical shape, the baked electrode layer 12 is prevented from being ground excessively. Therefore, portions of the baked electrode layer 12 that extend along the edge portions of the ceramic body 3 can have a sufficient thickness. Thus, the reliability of the multilayer ceramic capacitor 1 can be improved.

Next, Experimental Examples performed to provide preferred embodiments of the present invention will be described.

Ceramic bodies were prepared. Each ceramic body is used for a multilayer ceramic capacitor having a laminated structure including a plurality of ceramic layers made of barium titanate and a plurality of inner electrodes. Moreover, an electrically conductive paste was prepared by dispersing a copper powder and a glass powder in an acrylic varnish.

Next, to provide outer electrodes electrically connected to the inner electrodes, the electrically conductive paste was applied to portions of the surface of each ceramic body using a dip method, then dried, and baked in a belt furnace. In this manner, baked electrode layers used as substrates of the outer electrodes, including electrical connections with the inner electrodes, and mechanically adhering to the ceramic body were obtained. The amount of the glass in the baked electrode layers was about 22% by volume.

Then "blasting materials" shown in Table 1 were used to subject the surfaces of the baked electrode layers to sand blast processing. The "material," "particle shape," and "Mohs hardness" of each of the "blasting materials" are shown in Table 1. To find optimal conditions for the sand blast processing, a glass plate made of the same glass as the glass included in the baked electrode layers was prepared in advance, and the ejection amount of each blasting material and its ejection speed were adjusted such that the glass plate could be ground by the impact force of the blasting material, i.e., microcracks were formed in the glass plate and the glass plate were cracked and ground. It was discovered that, to perform the processing uniformly in a short time, a blasting material having an average particle diameter of about 120 µm or less was preferably used.

The surface of each baked electrode layer subjected to the sand blast processing was subjected to nickel plating and then to tin plating by electroplating to thus complete a multilayer ceramic capacitor including the solder-mountable outer electrodes.

The multilayer ceramic capacitor used as a sample was used to evaluate "Cracks in glass portions," "Flexural test (occurrence of cracks)," and "Chipping and cracking in ceramic body" shown in Table 1.

More specifically, the item "Cracks in glass portions" is the following evaluation. An outer electrode is subjected to cross-section polishing, and the cross section of the electrode is observed using an SEM/EDX to determine whether cracks are "present" or "absent" in the glass portions in the baked electrode layer.

The item "Flexural test" is the following evaluation. Twenty multilayer ceramic capacitors are subjected to a flexural strength test, and the number of samples having cracks formed therein is determined.

The item "Chipping and cracking in ceramic body" is the following evaluation. The outer appearances of 10000 multilayer ceramic capacitors are observed, and the ratio of samples having chipping or cracking formed in the ceramic bodies is determined.

TABLE 1

| Sample number | Blasting material | | | Cracks in glass portions | Flexural test (occurrence of cracks) | Chipping and cracking in ceramic body |
|---|---|---|---|---|---|---|
| | Material | Particle shape | Mohs hardness | | | |
| 1 | Baddeleyite | Irregular shape (angular shape) | 8 to 8.5 | Present | 3/20 | 0.8% |
| 2 | Zirconia | Spherical | 8 to 8.5 | Present | 2/20 | 0.3% |
| 3 | Zircon sand | Irregular shape (angular shape) | 7.5 | Present | 0/20 | 0% |
| 4 | Zircon | Spherical | 7.5 | Present | 0/20 | 0% |
| 5 | (Not processed) | | | Absent | 11/20 | 0% |

Referring to Table 1, sample 5 not subjected to the sand blast processing is a Comparative Example. The result of the evaluation of "Cracks in glass portions" was "absent," and the result of the evaluation of "Chipping and cracking in ceramic body" was "0%." As for the result of the "Flexural test," the occurrence of cracks was found in 11 out of 20 samples.

However, in all of samples 1 to 4 subjected to the sand blast processing, the result of the evaluation of "Cracks in glass portions" was "present."

The results of the evaluation of items other than the item "Cracks in glass portions" are compared between samples 1 to 4. In samples 1 and 2 in which blasting materials having a "Mohs hardness" of about 8 to about 8.5, which is comparable to the "Mohs hardness" of barium titanate, i.e., about 8 to about 8.5, were used, cracks occurred only in 2 to 3 out of 20 multilayer ceramic capacitors in the "Flexural test." As for the item "Chipping and cracking in ceramic body," chipping and cracking occurred only about 0.3% to about 0.8% of the samples. In samples 3 and 4 in which blasting materials having a "Mohs hardness" of about 7.5, which is lower than the "Mohs hardness" of barium titanate, i.e., about 8 to about 8.5, were used, no cracks occurred in all of the samples in the "Flexural test." As for the item "Chipping and cracking in ceramic body," no chipping and cracking occurred in all of the samples.

As can be seen from the above experimental results, the Mohs hardness of the blasting material is preferably about 8.5 or less and more preferably about 7.5 or less.

Although not shown in Table 1, when Zr/Al/Si complex oxides having a "Mohs hardness" of about 9, which is higher than the "Mohs hardness" of barium titanate, i.e., about 8 to about 8.5, were used as blasting materials, cracks occurred in all of the 20 multilayer ceramic capacitors in the "Flexural test." As for the item "Chipping and cracking in ceramic body," chipping and cracking occurred in slightly more than about 20% of the samples.

In Table 1, when the results of the evaluation of the items "Flexural test" and "Chipping and cracking in ceramic body" are compared between samples 1 and 2, differences can be seen. Specifically, as for the item "Flexural test," the result for sample 1 was "3/20," and the result for sample 2 was "2/20." As for the item "Chipping and cracking in ceramic body," the result for sample 1 was "0.8%," and the result for sample 2 was "0.3%." The reason for this may be the "particle shapes" of the "blasting materials."

The "particle shapes" of the "blasting materials" were further studied. More specifically, for each of the multilayer ceramic capacitors used as the samples, the "Maximum length of metal-lacking portions" and "Solder popping (spray-like solder popping)" were evaluated as show in Table 2.

The "Maximum length of metal-lacking portions" was determined as follows. Three outer electrodes were subjected to cross-section polishing, and the boundary between the nickel plating layer and the baked electrode layer of each outer electrode was observed using an SEM/EDX. Then the maximum length of the metal-lacking portions on the surface of the baked electrode layer was determined. The metal-lacking portions include metal-lacking portions formed of the glass and metal-lacking portions due to the adhesion of the powder.

As for the item "Solder popping," the number of samples in which spray-like solder popping occurred out of 1000 samples was determined.

TABLE 2

| Sample number | Particle shape of blasting material | Maximum length of metal-lacking portions | Solder popping (spray-like solder popping) |
|---|---|---|---|
| 1 | Irregular shape (angular shape) | 3.4 μm | 100 or more |
| 2 | Spherical | 1.7 μm | 3 |
| 3 | Irregular shape (angular shape) | 3.6 μm | 100 or more |
| 4 | Spherical | 1.2 μm | 2 |
| 5 | — | 3.8 μm | 100 or more |

The "Particle shape" of each "blasting material" shown in Table 1 is also shown in Table 2. In Table 2, attention should be given to comparisons between samples using "blasting materials" having the same "Mohs hardness" shown in Table 1 but having different "particle shapes" such as an "irregular shape" and a "spherical shape." Specifically, attention should be given to comparisons between samples 1 and 2 and comparisons between samples 3 and 4.

In samples 1 and 3, the values of the "Maximum length of metal-lacking portions" are larger than those in samples 2 and 4. Therefore, in samples 1 and 3, the results of the evaluation of "Solder popping" are "more than 100." In samples 2 and 4, the results of the evaluation of "Solder popping" are small single digit numbers, i.e., "3" and "2," respectively.

This is due to the following reason. When the "particle shape" of the "blasting material" used is an "irregular shape (angular shape)" as in samples 1 and 3, the metal-lacking portions formed of the glass can be caused to disappear or reduced in number. However, the powder itself is chipped and finely pulverized, and the pulverized powder is likely to adhere to the surface of the baked electrode layer, so that the metal-lacking portions due to the adhesion of the powder are formed or increased in number. FIG. 4 is a photograph of the baked electrode layer in sample 3.

When the "particle shape" of the "blasting material" used is "spherical" as in samples 2 and 4, the blasting material acts to squeeze the metal portions present on the surface of the baked electrode layer. The area of the metal portions on the surface of the baked electrode layer is thus increased, and the blasting material crushes and removes the glass portions. Therefore, the "Maximum length of metal-lacking portions" is reduced to about 1.7 µm or about 1.2 µm, and the ratio of the metal occupying the outermost surface of the baked electrode layer increases. Thus, the results of the evaluation of "Solder popping" were small one digit numbers, i.e., "3" and "2." As can be seen from the above, the "Maximum length of metal-lacking portions" is preferably about 1.7 µm or less. FIG. 2 is a photograph of the baked electrode layer in sample 4.

In sample 5 not subjected to the sand blast processing, the metal-lacking portions present on the surface of the baked electrode layer and formed of the glass remain unchanged. Therefore, the value of the "Maximum length of metal-lacking portions" is larger than those for samples 1 and 3, and thus the result of the evaluation of "Solder popping" in sample 5 is "more than 100." FIG. 3 is a photograph of the baked electrode layer in sample 5.

The ceramic electronic components according to preferred embodiments of the present invention have been described using the multilayer ceramic capacitors as examples. However, the present invention is applicable to other ceramic electronic components as long as they each include a ceramic body and further include a baked electrode layer formed using an electrically conductive paste as an outer electrode and a plating film provided on the baked electrode layer by electroplating.

The baked electrode layer included in the outer electrode is not limited to that disposed in contact with the surface of the ceramic body. A base electrode layer other than the baked electrode layer may be disposed on the surface of the ceramic body, and the baked electrode layer may be disposed on the base electrode layer.

The preferred embodiments described in the present specification are merely examples, and the structure in a preferred embodiment may be partially replaced or combined with the structure in another preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   a ceramic body including an inner electrode including a portion exposed at a surface of the ceramic body; and
   an outer electrode located on a portion of the surface of the ceramic body and electrically connected to the inner electrode; wherein
   the outer electrode includes a baked electrode layer including an electrically conductive metal and glass, and a plating film on a surface of the baked electrode layer;
   the baked electrode layer includes a metal portion including the electrically conductive metal, and a glass portion including the glass and distributed so as to be in contact with the metal portion; and
   a crack starting from a boundary between the metal portion and the glass portion and extending toward an inner side of the glass portion is provided in the glass portion.

2. The ceramic electronic component according to claim 1, wherein a metal-lacking portion in which the metal portion is not present is provided on the surface of the baked electrode layer.

3. The ceramic electronic component according to claim 2, wherein the metal-lacking portion includes the glass.

4. The ceramic electronic component according to claim 2, wherein the metal-lacking portion includes a material having a Mohs hardness equal to or lower than the Mohs hardness of the ceramic body.

5. The ceramic electronic component according to claim 2, wherein a maximum length of the metal-lacking portion on the surface of the baked electrode layer is about 1.7 µm or less.

6. The ceramic electronic component according to claim 1, wherein the ceramic body has a laminated structure including a plurality of laminated ceramic layers and a plurality of the inner electrodes, each of the plurality of inner electrodes being provided along a boundary between corresponding ones of the plurality of laminated ceramic layers.

7. The ceramic electronic component according to claim 1, wherein the ceramic body includes ceramic layers made of barium titanate.

8. The ceramic electronic component according to claim 1, wherein the electrically conductive metal is copper.

9. The ceramic electronic component according to claim 1, wherein the plating film includes a nickel layer and a tin layer on the nickel layer.

10. The ceramic electronic component according to claim 1, wherein an amount of the glass in the baked electrode layer is about 17% by volume or more.

11. The ceramic electronic component according to claim 1, wherein an amount of the glass in the baked electrode layer is about 22% by volume or more.

12. The ceramic electronic component according to claim 1, wherein an average particle size of the powder is about 120 µm or less.

* * * * *